United States Patent
Crawley, Jr. et al.

(10) Patent No.: US 10,060,280 B2
(45) Date of Patent: Aug. 28, 2018

(54) TURBINE CAVITY SEALING ASSEMBLY

(71) Applicant: United Technologies Corporation, Hartford, CT (US)

(72) Inventors: Clifton J. Crawley, Jr., Glastonbury, CT (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 253 days.

(21) Appl. No.: 14/884,513

(22) Filed: Oct. 15, 2015

(65) Prior Publication Data
US 2017/0107838 A1 Apr. 20, 2017

(51) Int. Cl.
| | |
|---|---|
| *F01D 11/02* | (2006.01) |
| *F01D 5/08* | (2006.01) |
| *F01D 9/06* | (2006.01) |
| *F02C 3/04* | (2006.01) |

(52) U.S. Cl.
CPC .............. *F01D 11/02* (2013.01); *F01D 5/082* (2013.01); *F01D 9/065* (2013.01); *F02C 3/04* (2013.01)

(58) Field of Classification Search
CPC ...... F01D 11/005; F01D 11/02; F01D 11/025; F01D 5/08; F01D 5/081; F01D 5/30072; F01D 9/065; F01D 25/08; F02C 3/04
See application file for complete search history.

(56) References Cited

U.S. PATENT DOCUMENTS

| | | | |
|---|---|---|---|
| 3,945,758 A | 3/1976 | Lee | |
| 4,613,141 A | 9/1986 | Heinen | |
| 4,709,545 A | 12/1987 | Stevens | |
| 4,767,260 A * | 8/1988 | Clevenger | F01D 9/041 415/115 |
| 5,137,284 A | 8/1992 | Holder | |
| 5,215,435 A * | 6/1993 | Webb | F01D 5/08 277/414 |
| 5,275,534 A | 1/1994 | Cameron et al. | |
| 5,364,543 A | 11/1994 | Bosna | |
| 6,035,627 A | 3/2000 | Liu | |
| 6,077,034 A * | 6/2000 | Tomita | F01D 5/08 415/110 |
| 6,217,279 B1 * | 4/2001 | Ai | F01D 9/065 415/110 |
| 6,558,114 B1 * | 5/2003 | Tapley | F01D 5/081 415/111 |
| 7,726,021 B2 | 6/2010 | Barnett | |
| 7,797,941 B2 | 9/2010 | Munsell | |
| 8,016,553 B1 | 9/2011 | Liang | |
| 8,038,399 B1 | 10/2011 | Liang | |

(Continued)

OTHER PUBLICATIONS

EP search report for EP16189592.5 dated Mar. 3, 2017.

(Continued)

*Primary Examiner* — Woody Lee, Jr.
*Assistant Examiner* — Elton Wong
(74) *Attorney, Agent, or Firm* — O'Shea Getz P.C.

(57) ABSTRACT

Aspects of the disclosure are directed to a gas turbine engine, comprising a sealing assembly that includes a non-contacting HALO seal, a ring constructed as a full ring and configured as a carrier of the seal, a sealing land configured to rotate and interface to the seal. In some embodiments, the engine further comprises a vane, where the ring is coupled to the vane.

12 Claims, 3 Drawing Sheets

(56) References Cited

U.S. PATENT DOCUMENTS

| | | | |
|---|---|---|---|
| 2005/0220610 A1 | 10/2005 | Ghasripoor | |
| 2007/0098545 A1* | 5/2007 | Alvanos | F01D 5/081 |
| | | | 415/170.1 |
| 2011/0243749 A1 | 10/2011 | Praisner et al. | |
| 2012/0177485 A1 | 7/2012 | Virkler et al. | |
| 2014/0140827 A1* | 5/2014 | Hagan | F02C 7/28 |
| | | | 415/174.5 |
| 2014/0255167 A1* | 9/2014 | Stevens | F01D 11/12 |
| | | | 415/173.3 |
| 2017/0044915 A1* | 2/2017 | Mugglestone | F01D 9/065 |
| 2017/0096903 A1* | 4/2017 | Schiessl | F01D 5/3007 |

OTHER PUBLICATIONS

Brent A. Gregory, "Gas Turbines: Monitor engine cooling-air flows to enable top performance", downloaded from <http://www.ccj-online.com/2q-2013/gas-turbines-monitor-engine-cooling-air-flows-to-enable-top-performance-2/>, 2014.

* cited by examiner

US 10,060,280 B2

TURBINE CAVITY SEALING ASSEMBLY

BACKGROUND

Seals are incorporated in an aircraft engines in an effort to minimize a flow of fluid (e.g., air) from a first region to a second region. The quality of the sealing that is obtained is based at least in part on the quality and characteristics of the materials that are used in connection with the sealing assembly.

Conventionally, in a turbine section of an engine a labyrinth seal is used in an effort to prevent a flow (e.g., a combustion gas flow) from bypassing a vane (e.g., a so-called second vane) of the turbine section. An inadequate sealing assembly leads to: (1) a loss of work by the turbine section from hot gases output by a combustor section of the engine, (2) an increase in temperature experienced by structure (e.g., rotating structure) downstream of the labyrinth seal from hot air that enters a first, forward cavity en route/on the way to a second, aft cavity, and (3) a recirculation of the hot air in the forward cavity. In short, an inadequate sealing assembly represents a loss in terms of engine efficiency and increases in temperature experienced by components of the engine lead to a reduction in the serviceable lifetime of those components.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine, comprising: a sealing assembly that includes: a non-contacting HALO seal, a ring constructed as a full ring and configured as a carrier of the seal, a sealing land configured to rotate and interface to the seal. In some embodiments, the engine further comprises a vane, where the ring is coupled to the vane. In some embodiments, the ring is coupled to the vane using at least four centering features. In some embodiments, each of the at least four centering features includes at least one slot formed in the ring, and at least one attachment mechanism includes at least one of: a pin, a clip, a fastener, or some other local feature to mate with the slot and center the ring. In some embodiments, the vane includes a plurality of segments, and substantially all of a plurality of circumferential sealing points between the ring and the vane segments include at least one sealing feature, the at least one sealing feature including at least one of a sheetmetal "C" seal or a "W" seal. In some embodiments, the vane includes a plurality of segments, and vane segments that are within an inner diameter cavity are at least one of feathersealed or shiplapped in order to form a cooling air plenum to store at least some of a cooling pressure. In some embodiments, the cooling air plenum includes a connection on the vane that is coupled to a tube on the ring. In some embodiments, the engine further comprises a rotor structure associated with a turbine blade located forward of the seal, the ring, and the sealing land, where the rotor structure, the ring, and the sealing land at least partially define a first cavity. In some embodiments, the ring and the vane are configured to form a second cavity by subdividing the first cavity into an outer and an inner region that serves as a first source of cool air for the first cavity. In some embodiments, the engine further comprises a compressor section configured to provide a second source of cool air to the first cavity. In some embodiments, the rotor structure is associated with a third source of cool air that is configured to be provided to the first cavity. In some embodiments, the engine further comprises a first side plate coupled to the rotor structure. In some embodiments, an outermost portion of the first side plate that interfaces to the first cavity is segmented. In some embodiments, an innermost portion of the first side plate that interfaces to the rotor structure is a full ring. In some embodiments, the engine further comprises a second rotor structure associated with a second turbine blade located aft of the seal, the ring, and the sealing land, where the second rotor structure, the ring, and the sealing land at least partially define a second cavity. In some embodiments, the engine further comprises a second side plate coupled to the second rotor structure. In some embodiments, an outermost portion of the second side plate that interfaces to the second cavity is segmented. In some embodiments, an innermost portion of the second side plate that interfaces to the second rotor structure is a full ring.

DETAILED DESCRIPTION

Figure 1:
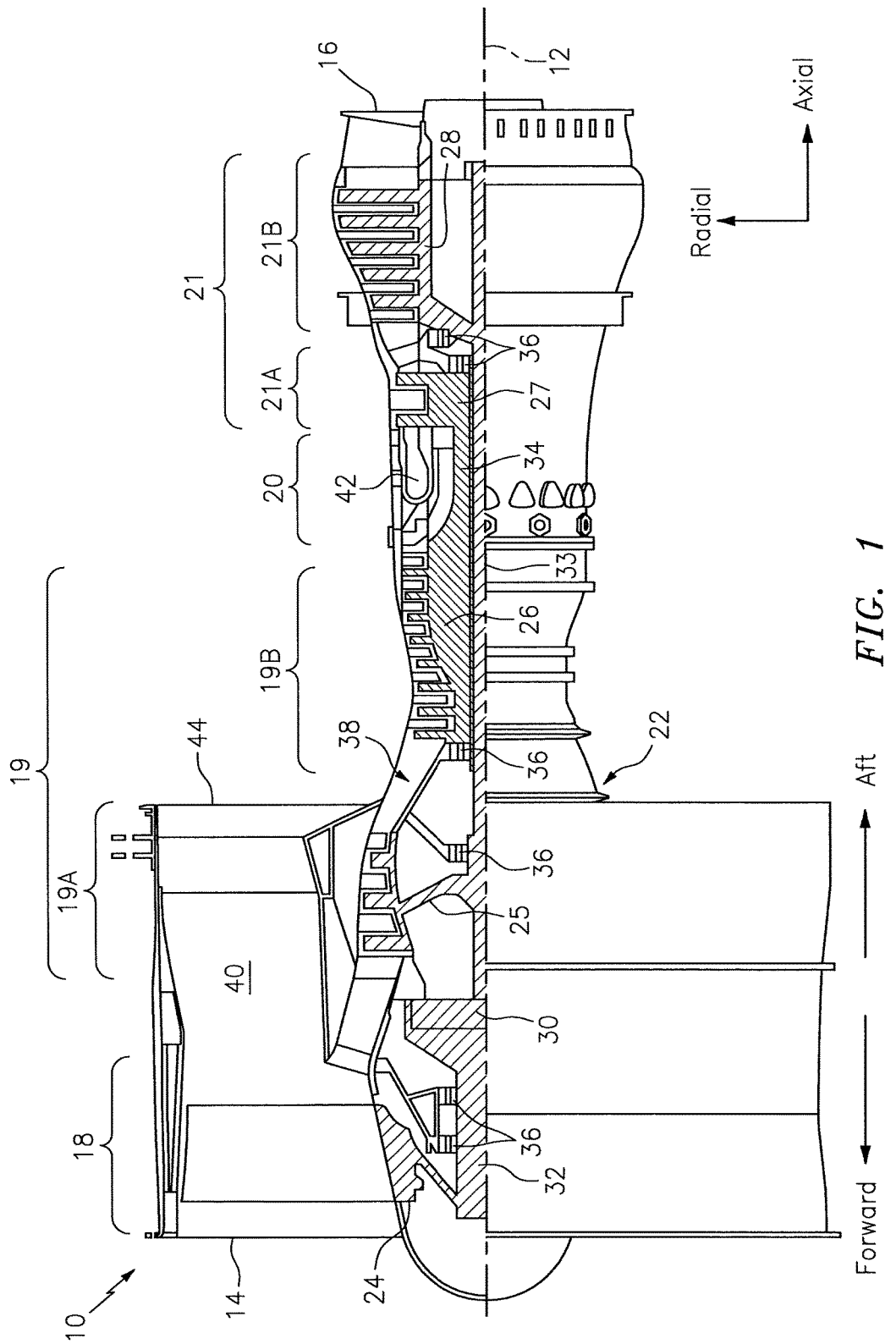
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing one or more seals in connection with an engine. In some embodiments, the seal may include at least some characteristics that are common with a HALO™ seal provided by, e.g., Advanced Technologies Group, Inc. of Stuart, Fla. In some embodiments, a sealing assembly may be provided to increase/maximize engine efficiency and component lifetimes.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 (e.g., outer surfaces of the shafts) are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for an engine of an aircraft (e.g., an airplane, a helicopter, etc.).

In accordance with aspects of this disclosure, a seal may be used for purposes of isolation (e.g., fluid isolation) between two or more interfaces. For example, a seal may be used in connection with one or more of the devices/components associated with the engine 10. Such devices/components may include, or be associated with, the compressor section 19, the turbine section 21, etc. In some embodiments, a seal may be incorporated between a first structure and a second structure.

Figure 2:
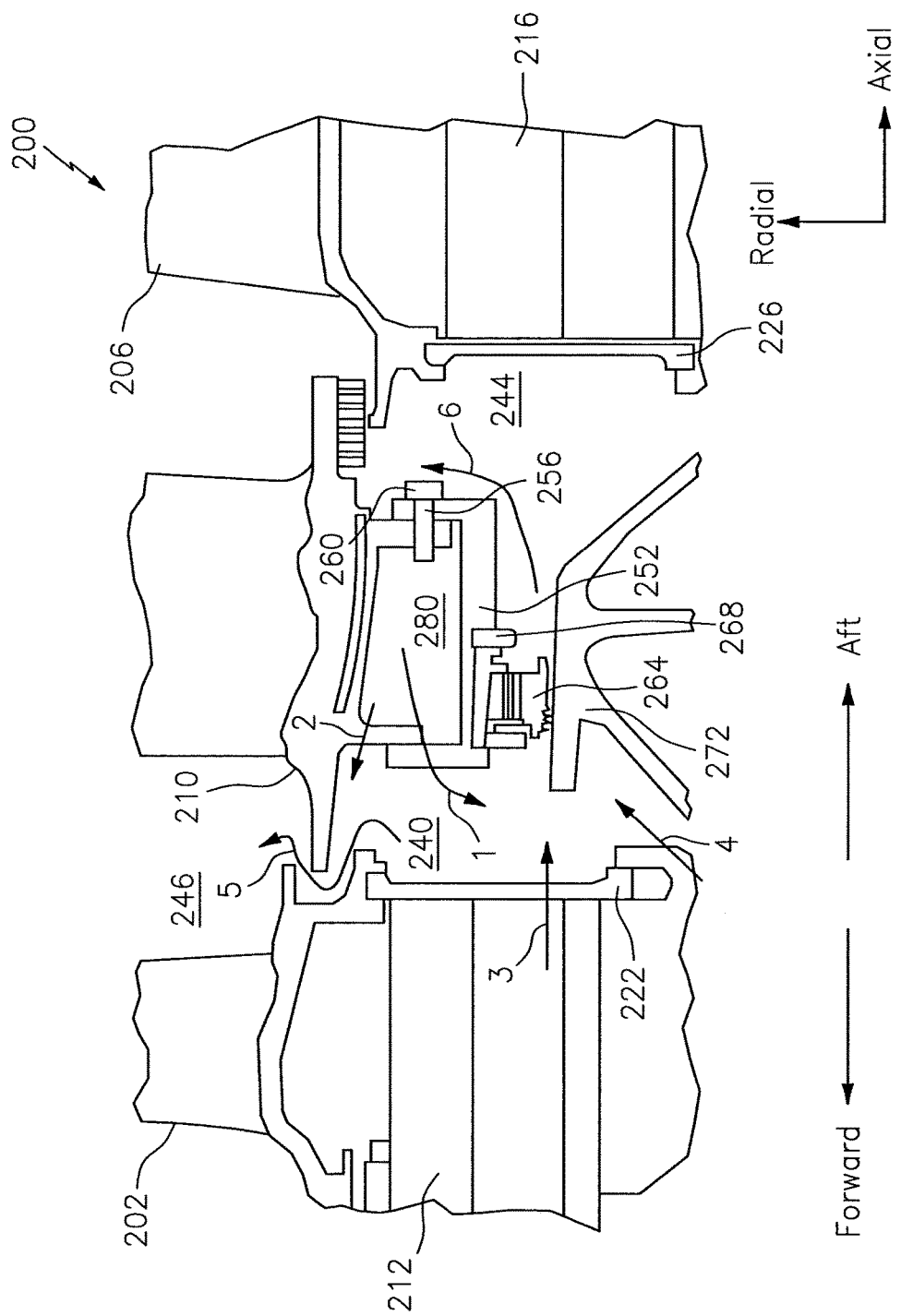
FIG. 2 illustrates a portion of an exemplary engine for providing a sealing assembly in accordance with aspects of this disclosure.

Referring to FIG. 2, a portion of an engine 200 is shown. The engine 200 may correspond to a portion of the engine 10 of FIG. 1. For example, the engine 200 may represent a portion of the high pressure turbine (HPT) section 21A.

As shown, the engine 200 may include a first blade 202, a second blade 206, and a vane 210. The vane 210 may be located between the blades 202 and 206 in the axial direction. Between the first blade 202 (and associated rotor structure 212 that may include slots and a disk) and the vane 210 there may be defined a first, forward cavity 240. As shown, the cavity 240 may be forward of a plane formed via a mid-chord of the vane 210. Similarly, between the vane 210 and the second blade 206 (and associated rotor structure 216 that may include slots and a disk) there may be defined a second, rear/aft cavity 244.

The vane 210 may include one or more feather seals/pieces of (layered) sheet metal. The feather seals may be oriented in the vertical/radial direction and/or in the horizontal/axial direction. Other orientations may be used. In some embodiments, the vane 210 may be segmented.

The engine 200 may include a ring 252. The ring 252 may be constructed as a full ring or as a segmented ring.

The vane 210 and the ring 252 may be coupled to one another using one or more slots (denoted via reference character 256) formed in the ring 252 and one or more centering features/attachment mechanisms 260. In some embodiments, the centering features 260 may be located substantially at 12, 3, 6 and 9 O'Clock positions. In some embodiments, the centering features/attachment mechanism(s) 260 may include at least one of: a pin, a clip, a fastener, or some other local feature or raised feature to mate with the slot 256 and center the ring 252. In some embodiments, all (or substantially all) of the points between the ring 252 and the vane 210 may be full rings.

In some embodiments, sealing points (e.g., circumferential sealing points) between the ring 252 and the vane/vane segments 210 may have sealing features, such as for example sheetmetal "C" seals or "W" seals. In some embodiments, segmented vanes 210 may have axial "W" seals or radial "W" seals.

The ring 252 may float based on the use of the attachment mechanism(s) 260 and the slot(s) 256, thereby allowing the ring 252 to expand independent of the vane 210 while at the same time being held concentric to the engine centerline. In some embodiments, the ring 252 may be pinned (directly) to the vane 210.

The ring 252 may be coupled to a seal 264 via a fastener/fastening ring 268. The seal 264 may be, or include, a HALO seal. The ring 252 may serve as a carrier of the seal 264 and a tangential on-board injection (TOBI) cascade or multiple discrete TOBI nozzles.

The seal 264 may interface to, but might not contact, a rotating sealing land 272. In some embodiments, the land 272 may be manufactured (e.g., coated) with a hardface having extra material for machining and cleaning up the hardface during engine maintenance or inspection.

The rotor structure 212 may be coupled to a side plate assembly 222. Similarly, the rotor structure 216 may be coupled to a side plate assembly 226. The side plates 222 and 226 may be substantially smaller in terms of, e.g., dimension or mass relative to their corresponding rotor structures 212 and 216, respectively. In this regard, at least the outermost portion of the side plate 222 that interfaces to the cavity 240 may be segmented and at least the outermost portion of the side plate 226 that interfaces to the cavity 244 may be segmented. Segmented interfaces may be used to avoid having the side plates 222 and 226 buckle/warp in the presence of load (e.g., thermal load). The innermost portion of the side plate 222 (e.g., the portion of the side plate 222 that interfaces to the rotor structure 212) and/or the innermost portion of the side plate 226 (e.g., the portion of the side plate 226 that interfaces to the rotor structure 216) may be segmented or may be a full ring.

The (forward-most surface of the) blade 202 may initially interface with the hot gases/air output from the combustor section (e.g., combustor section 20) of the engine. As such, the blade 202 and any components/structure proximate the blade 202 may need to be cooled due to the presence of such hot gases. Conversely, the blade 206 may be located far enough downstream from the combustor section such that the blade 206 might not require any cooling or may only need minimal amounts of cooling.

To facilitate cooling as described above, cool air may be provided to the cavity 240 from one or more sources. For example, an interior cavity 280 formed between the vane 210 and the ring 252 may serve as a plenum/storage for cool air provided through the vane 210 (e.g., at least a portion of the vane 210 may be hollow to enable a passage of cooling air).

As reflected via the arrow 1 in FIG. 2, at least a first portion of the cool air in the cavity 280 may be provided to the cavity 240 at a first direction/orientation and in a first amount. A second portion of the cool air in the cavity 280 (denoted by arrow 2) may be provided to the cavity 240 at a second direction/orientation and in a second amount, where the second orientation may be different from the first orientation and/or the second amount may be different from the first amount.

Another source of cool air provided to the cavity 240 may be obtained from the compressor section (e.g., a high stage compressor) of the engine. This source of cool air is reflected via arrow 3 in FIG. 2.

Still further, cool air provided to the cavity 240 may be obtained via one or more localized, rotating cooling sources, such as for example in connection or association with the rotor structure 212. This localized cooling air is reflected via arrow 4 in FIG. 2. The skilled artisan would appreciate that arrow 2 provides for ultra-high cooling capability. The arrow 4 may be used to precondition the air that, on an unsteady, pulsing basis, may be moving into areas/regions 340-1 and 340-3 (see FIG. 3). So this preconditioning air 4 may be relatively small and dependent on how effective the optional wings/structures 301, 303, and 312 (see FIG. 3).

The flows associated with the arrows 1-4 may be facilitated via the use of one or more injectors/holes/nozzles in the corresponding structures where those flows 1-4 are respectively shown. The flows 1-4 may be facilitated via the use of TOBI.

As a result of the arrangement of FIG. 2, a net positive outflow of air 5 may be obtained from the cavity 240 to a region 246 between the blade 202 and the vane 210. This outflow 5 may be used to reduce the temperature in the cavity 240 and hardware/structure that is proximate to the cavity 240.

For completeness, arrow 6 in FIG. 2 reflects a flow of air to the cavity 244.

Figure 3:
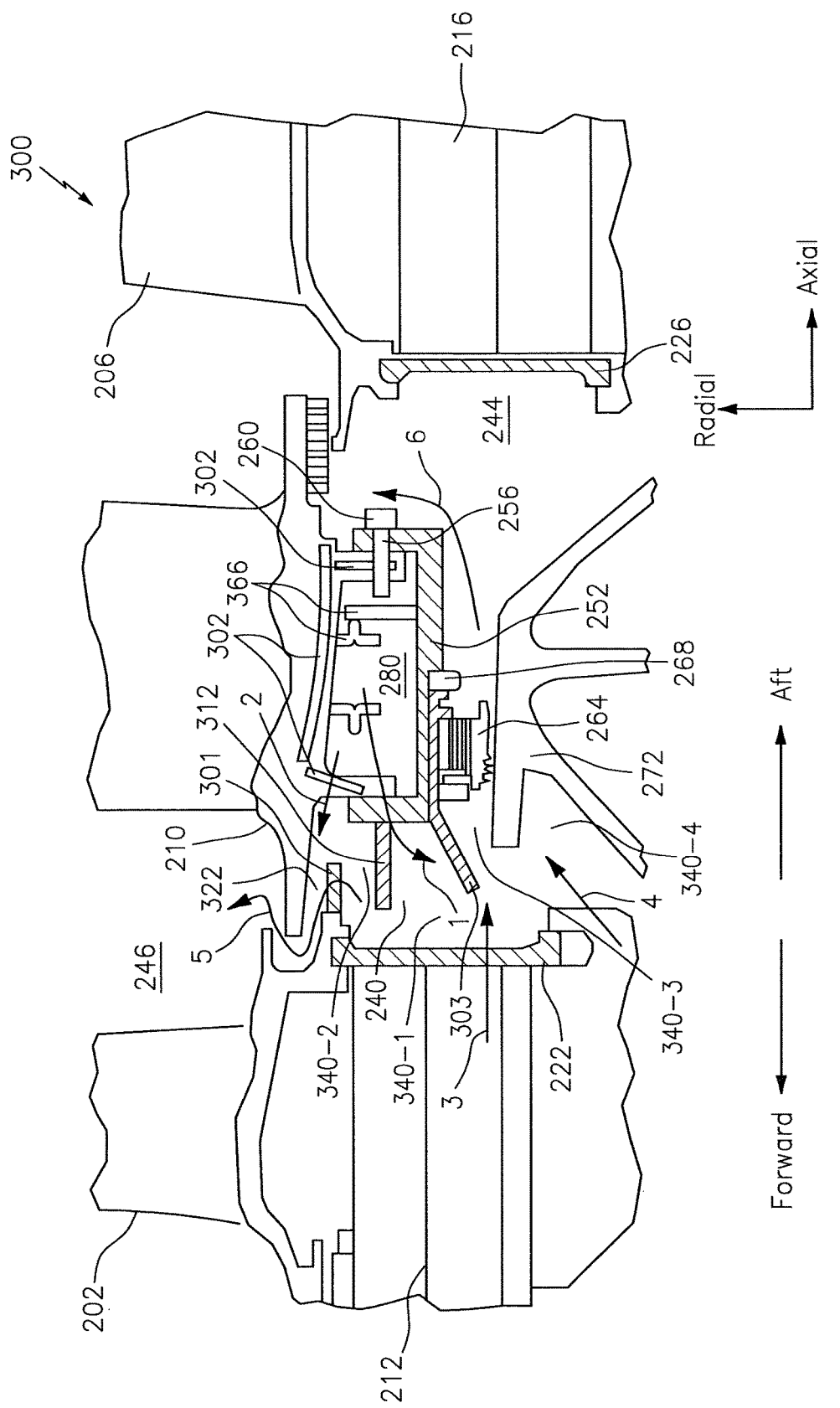
FIG. 3 illustrates a portion of an exemplary engine for providing a sealing assembly in accordance with aspects of this disclosure.

Referring to FIG. 3, a portion of an engine 300 is shown. The engine 300 may correspond to a portion of the engine 10 of FIG. 1 and/or the engine 200 of FIG. 2.

Referring to FIGS. 2-3, the region 246 between the blade 202 and the vane 210 may be extremely hot and a source of unsteady flow in a direction opposite arrow 5. This occurs because the flow path pressure is unsteady as blades pass by and interact with the airfoil that is the vane 210. So an area/region 322 (formed between a structure 301 and the vane 210) associated with the arrow number 2 is likely to be a small flow to reduce the temperature of the cavity because some the pressure pulses of arrow/flow 5 will also effect the cavity 240 at areas/regions 340-1 and 340-3.

Based on a review of this disclosure, the skilled artisan would appreciate that a reduction in temperature in the area/region 322 may be desirable. The majority of cooling air may then be provided to areas/regions 340-1 (formed between structure 312 and 303), 340-2 (formed between structure 301 and 312), and 340-3 (at least partially formed by the structure 303) from the blade cavity 280 or area/region 340-4 in connection with arrow 4 (from the rotor system, generally), or any combinations of these. The cheapest air from a compression cycle standpoint is from cavity 280, but that might not be the only consideration, there may be too much air from 4 available due to a host of other considerations.

As described above, the structures 301, 303, and 312 may be used to define or sub-divide various cavities or area/regions. Such divisions may be expressed in terms of their relative locations (e.g., inner, outer, forward, aft, etc.).

The manifold at cavity 280 may have featherseals and/or be shiplapped as shown in FIG. 3 at 302. In some embodiments, there may be one or more jumper tubes 366 welded into the vane 210 or welded into the ring 252 that can feed flow to arrow 1. The jumper tubes 366 may allow the ring 252 to expand/contract independent of the vane 210, thereby providing for a degree of thermal independence between the ring 252 and the vane 210. For example, the tube(s) 366 may include sliding joints or a bellow that allows the ring 252 and the vane 210 to expand and contract independently.

As described above, aspects of the disclosure may be used to convey cooling air forward of a seal (e.g., a HALO seal). In some embodiments, the cooling air may be sourced/originate from a vane and/or a rotor. In some embodiments, cooling air may be conveyed to one or more cavities that may be created in proximity to or in front of the seal.

As described above, aspects of the disclosure may be applied in connection with one or more seals. In some embodiments, a sealing assembly may include a HALO seal, a honeycomb/labyrinth seal, a feather seal, a W-seal, etc.

Technical effects and benefits of the disclosure include a sealing assembly that is used in an engine of an aircraft to obtain a reduction in leakage at one or more locations of the engine. Moreover, the sealing assembly may enable one or more air streams of the engine to be routed in a more efficient manner relative to conventional engine platforms.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:
1. A gas turbine engine, comprising:
   a sealing assembly that includes:
      a non-contacting seal;
      a ring constructed as a full ring that carries the seal;
      a rotatable sealing land that interfaces with the seal; and
      a vane,
   wherein the ring is coupled to the vane,
   wherein the vane includes a plurality of segments, and wherein vane segments that are within a radially inner diameter cavity are at least one of feathersealed or shiplapped in order to form a cooling air plenum to store at least some of a cooling pressure,
   wherein the cooling air plenum includes a connection on the vane that is coupled to a tube on the ring, and
   wherein the tube includes at least one of a sliding joint or a bellow that allows the ring and the vane to expand and contract independent of one another.
2. The engine of claim 1, wherein the ring is coupled to the vane using at least four centering features.

3. The engine of claim 2, wherein each of the at least four centering features includes at least one slot formed in the ring, and wherein at least one attachment mechanism includes at least one of: a pin, a clip, a fastener, or some other local feature to mate with the slot and center the ring.

4. The engine of claim 1, further comprising:

a rotor structure associated with a turbine blade located forward of the seal, the ring, and the sealing land, wherein the rotor structure, the ring, and the sealing land at least partially define a first cavity.

5. The engine of claim 4, wherein the ring and the vane form a subdivided part of the first cavity by subdividing the first cavity into a radially outer region and a radially inner region, wherein the radially inner region serves as a first source of cool air for the radially outer region.

6. The engine of claim 5, further comprising:

a compressor section configured to provide a second source of cool air to the first cavity.

7. The engine of claim 6, wherein the rotor structure is associated with a third source of cool air that is configured to be provided to the first cavity.

8. The engine of claim 4, further comprising:

a first side plate coupled to the rotor structure.

9. The engine of claim 8, further comprising:

a second rotor structure associated with a second turbine blade located aft of the seal, the ring, and the sealing land, wherein the second rotor structure, the ring, and the sealing land at least partially define a second cavity.

10. The engine of claim 9, further comprising:

a second side plate coupled to the second rotor structure.

11. The engine of claim 1, wherein the tube is welded into the ring.

12. A gas turbine engine, comprising:

a sealing assembly that includes:
 a non-contacting seal;
 a ring that carries the seal;
 a rotatable sealing land that interfaces with the seal; and
a vane,
wherein the ring is coupled to the vane,
wherein the vane includes segments that are within a radially inner diameter cavity and are at least one of feathersealed or shiplapped in order to form a cooling air plenum,
wherein the cooling air plenum includes a connection on the vane that is coupled to a tube on the ring, and
wherein the tube includes at least one of a sliding joint or a bellow that allows the ring and the vane to expand and contract independent of one another.

* * * * *